Sept. 26, 1944.  A. MARKWALDER  2,359,045
MOTIVE PLANT FOR WATERCRAFT OR AIRCRAFT
Filed April 28, 1942  2 Sheets-Sheet 1
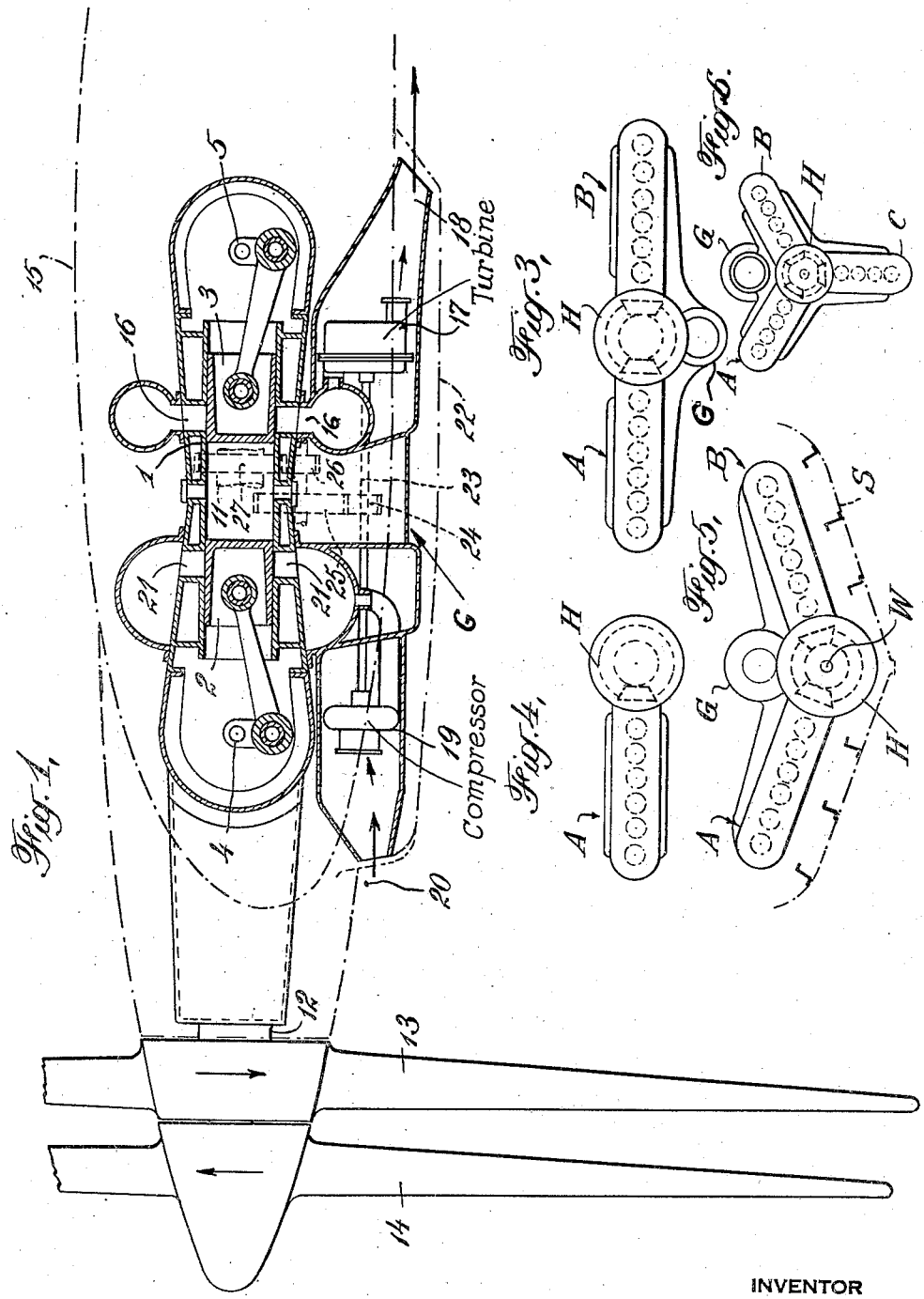
INVENTOR
ALBERT MARKWALDER
BY
ATTORNEYS

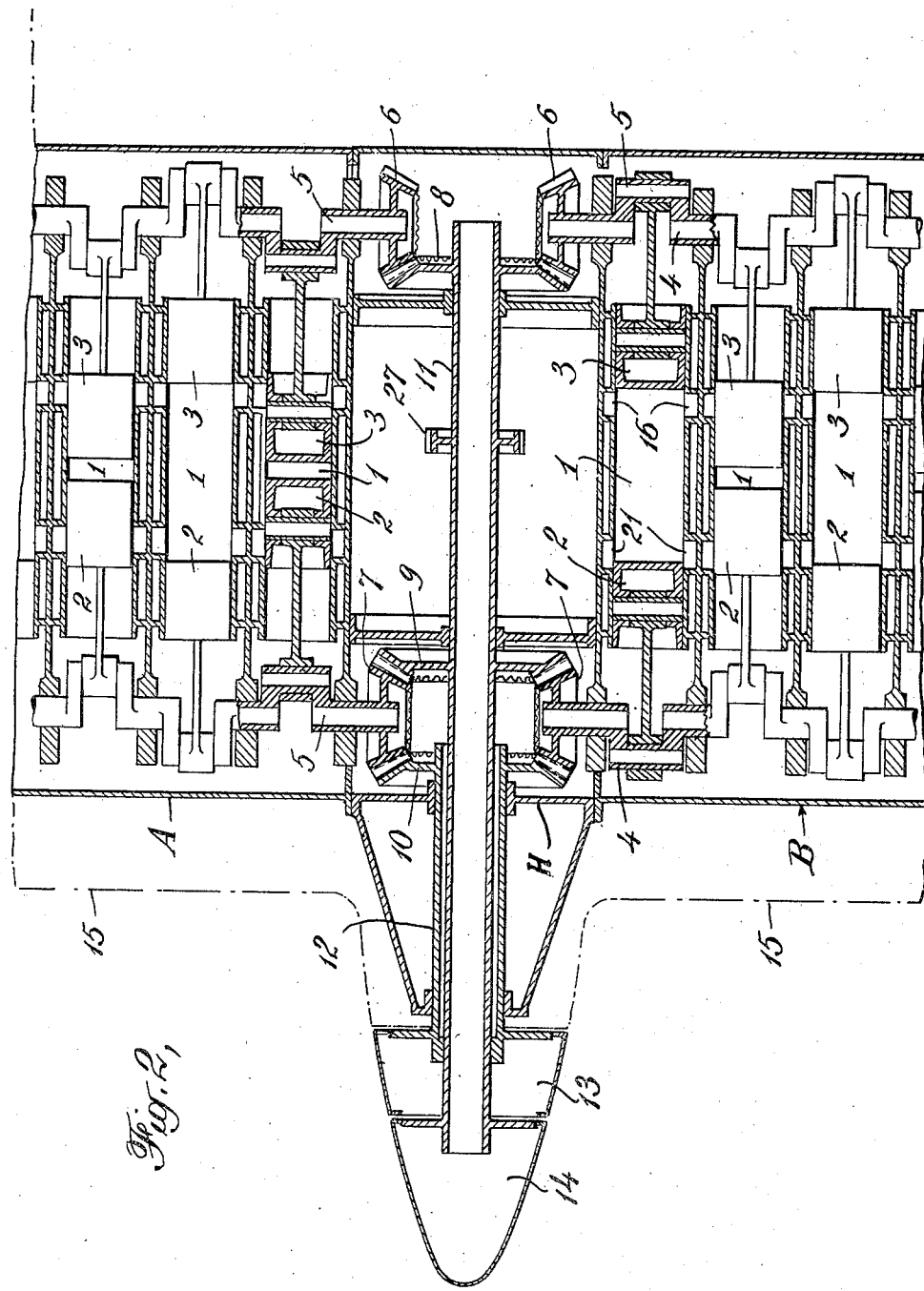

Patented Sept. 26, 1944

2,359,045

UNITED STATES PATENT OFFICE 2,359,045

MOTIVE PLANT FOR WATERCRAFT OR AIRCRAFT

Albert Markwalder, Eschlikon, Dinhard, Switzerland, assignor to Sulzer Frères, Société Anonyme, Winterthur, Switzerland Application April 28, 1942, Serial No. 440,889
In Switzerland September 20, 1941

4 Claims. (Cl. 60—13)

The invention relates to motive plant for watercraft or aircraft, with at least one two-shaft opposed-piston internal combustion engine. The invention consists in that the cylinders of the internal combustion engine lie parallel to the direction of motion of the vessel and the crankshafts drive, through bevel gear, at least one propeller shaft also lying parallel to the direction of motion of the vessel. The crankshafts may also drive two propeller shafts arranged concentrically and rotating in opposite directions. Preferably the crankshafts are at the same time coupled to each other through the bevel gear in such a way that they run at same speed. Several internal combustion engines driving one propeller shaft in common through bevel wheel gear can be arranged in the form of a star. Also a charging set, consisting of exhaust gas turbine and axial compressor, may be arranged with its axis parallel to the direction of motion of the vessel. It is preferable to couple this charging set to the internal combustion engine through the bevel gear.

The invention is here explained more particularly with reference to the drawings, in which Fig. 1 shows a cross-section, Fig. 2 a longitudinal section, and Fig. 3 the front view to a smaller scale of a first example of execution of such a plant. Figs. 4, 5, and 6 show three further examples of executions according to the invention.

The pistons 2 and 3, moving opposite to each other in the cylinders 1 of the aircraft propelling plant according to Figs. 1 to 3, drive the crankshafts 4 and 5 which transmit the power through the bevel wheels 6—10, contained in the gear casing H, to the propeller shafts 11 and 12. The propeller shafts rotate in contrary directions, and each drives an airscrew 13 or 14. The bevel wheels 6—9 serve at the same time also for ensuring that the crankshafts 4 and 5 of the two cylinder blocks A and B run at exactly the same speed. The cylinder blocks A and B and the gear casing H are arranged within the profile of the supporting wing 15.

The gases from the internal combustion engine, issuing through the ports 16, pass to the exhaust gas turbine 17 of a charging set G and then flow to atmosphere through the pipe 18 under the wing in the low-pressure region of the covering 22. Compressor 19 draws air from the suction spot 20 of the covering 22, and delivers it in a compressed state through the ports 21, as combustion air, into the cylinders 1. The shaft 23, by means of which the turbine 17 drives the compressor 19, is connected through a toothed wheel gear 24—27 to the propeller shaft 11, so that any excess power developed by the turbine serves to propel the shaft, and on the other hand if there is any lack of power, the internal combustion engines can be used to help to drive the compressor 19.

Instead of two cylinder blocks A and B at two sides of the gear case H, it is also possible as shown in Fig. 4, to arrange only one cylinder block A at one side of the gear case. This driving plant is recommended particularly for vehicles in which at least two symmetrically built plants are adopted.

The marine propelling plant shown in Fig. 5, in which the cylinder blocks A and B are inclined to each other and fixed to the gear case H, so that the propeller shaft W is located as low as possible in the ship's hull. The exhaust turboblower G is arranged over the gear casing.

A further possible execution, which is more suitable for aircraft, is shown in Fig. 6. Here three cylinder blocks A, B and C are arranged in the form of a star round a gear case H. The exhaust gas turboblower G is arranged at the top between the blocks A and B.

I claim:

1. A power plant for driving a vessel which comprises an opposed-piston internal combustion engine having its cylinders parallel to the direction of motion of the vessel, two concentric propeller shafts parallel to the said direction of motion and each having means for mounting a separate propeller thereon, gear means connected to the engine crankshafts separately connected to each propeller shaft and arranged to drive the shafts in opposite directions at the same time, a charging set comprising an exhaust gas turbine and compressor arranged on a common shaft with its axis parallel to the said direction of motion, and gear means connecting the shaft of the charging set to one of the propeller shafts, whereby the shaft of the charging set supplies power to or receives power from the propeller shaft.

2. A power plant for driving a vessel which comprises an opposed-piston internal combustion engine having its cylinders parallel to the direction of motion of the vessel, a propeller shaft parallel to the said direction of motion and having means for mounting a propeller thereon, gear means connected to the engine crankshafts and also connected to and arranged to drive the propeller shaft, a charging set comprising an exhaust gas turbine and compressor having a common shaft axis arranged with the axis parallel to the said direction of motion, and gear means connecting the shaft of the charging set to the propeller shaft, whereby the shaft of the charging set supplies power to or receives power from the propeller shaft.

3. A power plant according to claim 2 which comprises a plurality of said engines, and gear means interconnecting the crankshafts of the separate engines and the propeller shaft whereby the engines all drive the same propeller shaft.

4. A power plant for driving an aircraft which comprises an opposed-piston internal combustion engine having its cylinders parallel to the direction of motion of the aircraft, a propeller shaft parallel to the direction of motion of the aircraft and having means for mounting a propeller thereon, gear means connected to the engine crankshafts and also connected to and arranged to drive the propeller shaft, a charging set comprising an exhaust gas turbine and compressor having a common shaft arranged with the axis parallel to said direction of motion, means providing a low-pressure region at the under portion of the aircraft, said charging set being located below the engine, means for admitting air into the compressor, exhaust-gas conduit means for discharging the exhaust gas from said turbine into the low-pressure region, and gear means connecting the engine to the shaft of the charging set, whereby the shaft of the charging set supplies power to or receives power from the engine.

ALBERT MARKWALDER.